(No Model.)

L. LAPYRE.
DEVICE FOR TRANSMITTING MOTION AND POWER.

No. 262,794. Patented Aug. 15, 1882.

Witnesses:
W. B. Masson
Harry Bernhard

Inventor
Leopold Lapyre
By Edson Bros.
Attorneys

United States Patent Office.

LEOPOLD LAPYRE, OF ST. LOUIS, MISSOURI.

DEVICE FOR TRANSMITTING MOTION AND POWER.

SPECIFICATION forming part of Letters Patent No. 262,794, dated August 15, 1882.

Application filed July 24, 1882. (No model.)

*To all whom it may concern:*

Be it known that I, LEOPOLD LAPYRE, a citizen of the United States, residing at St. Louis, in the county of St. Louis and State of Missouri, have invented certain new and useful Improvements in Transmitting Motion and Power; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a means for the transmission of power which shall operate effectively and without undue friction and noise.

With this object in view my invention consists, first, in the employment of a confined liquid in such a manner that motion imparted to it in one locality is conveyed by a current thereof to another locality and there imparted to a suitable mechanism adapted to be operated thereby, and to subsequently permit of the return of said liquid to the place of starting to be again used as a medium of transmitting power.

My invention consists, secondly, in the means employed for the use of liquids in transmitting power, comprising a closed chamber having therein a driving-shaft provided with means for giving motion to the contained liquid, a conduit for the liquid in motion, a second chamber connected to the first chamber by said conduit, and having therein a shaft provided with means for receiving motion from the liquid, and a return-conduit from the second to the first chamber.

My invention also consists in certain details hereinafter described, and specifically set forth in the claims.

Figure 1:
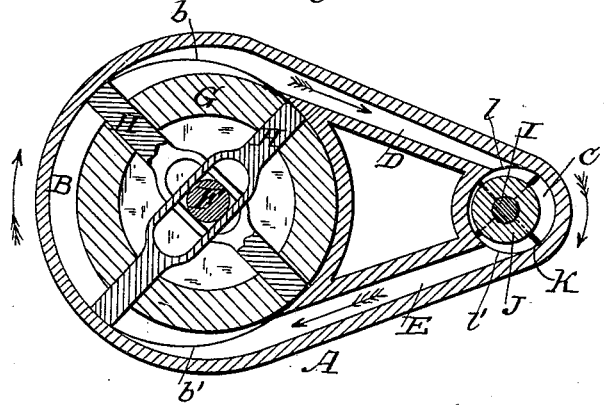
Figure 2:
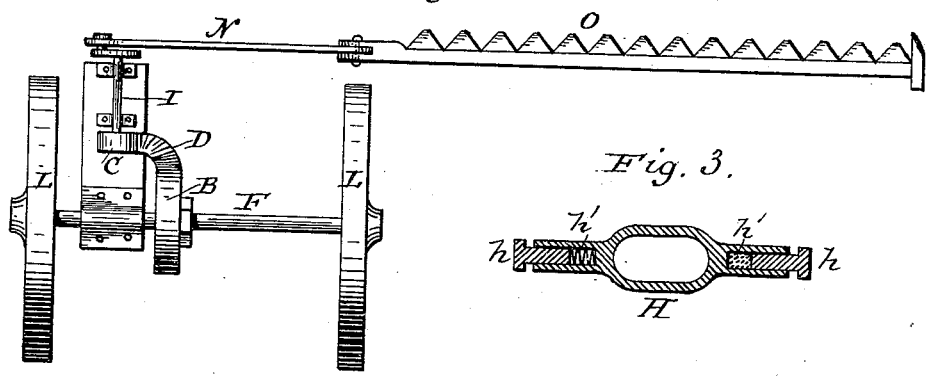
Figure 3:
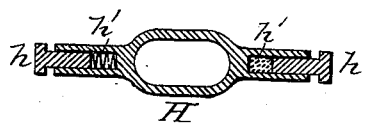

Figure 1 is a vertical longitudinal central section of the means employed by me in transmitting power according to my invention. Fig. 2 is a view of a portion of a mower sufficient in extent to illustrate one manner of applying my inventon thereto for its operation. Fig. 3 is a modification.

A represents a casing, which may, as desired, be one integral casting cast in halves and bolted together, or of several separate castings suitably joined together, the essential features of its construction being two chambers, B and C, and two connecting-conduits, D and E, and these latter may be of wrought or drawn or cast piping, and they may be united or connected to the chambers by the usual screw-threaded couplings. Within the chamber B is a driving-shaft, F, having a rigidly-attached concentric disk, G, the shaft and disk being set eccentrically therein, and provided with two double sliding gates or valves, H, slotted at their middle portions to embrace the shaft and sliding in radial apertures in the disk, the outer ends of said valves being adapted to fit the chamber B. Projecting into the chamber from its sides and near those points where the chamber merges into the conduits are guiding-ribs $b\ b'$, which act to control the movement of the sliding valves H, causing them to recede into the disk as they approach the guide $b$, and consequently causing the opposite end of each valve so affected to project from the disk as it approaches and passes upon or traverses the guide $b'$, and this by reason of the eccentricity of the disk with relation to the chamber and the rotation of the shaft in one direction. If the shaft be rotated in the opposite direction, the same operation is caused by the opposite guides, and hence the apparatus is adapted to transmit power in either direction at will. The chamber C is provided with a shaft, I, and disk J, having valves K, and with guides $b'$, all constructed as are their counterparts in the chamber B.

I have shown the chamber C and its accessories of smaller diameter than the chamber B; but this is not essential, nor is the length of the conduits D E an essential feature, as the chambers may be of equal diameter and capacity and the conduits of any length or contour, it being only necessary that the conduits do not communicate with each other and that the same feature pertains to the chambers— that is, they should not communicate directly with each other except by means which act to conduct a current of liquid from one to the other. The liquid to be used is a matter of selection. It may be water, oil, alcohol, air, or gas, or any other suitable substance capable of performing the function described. It will be readily seen that if the shaft be rotated in either direction—for example, that shown by arrow at chamber B—the liquid contained therein and in the conduits and chamber C (it being designed that all of the interior portions named shall be full) will be put in motion by the action of the valves thereon, and will pass through the conduit D, and, striking against the valves K, will cause them and the disk J and its attached shaft I to revolve, and will then pass through conduit E to the chamber B, to be again driven around the course. By this operation shaft F operates shaft I and any machinery connected therewith. The shaft F may be operated by a steam-engine or a water-wheel; or any desired source of power may be employed, and so may shaft I be employed to drive any machinery.

In Fig. 2 the shaft F is the axle of a mowing-machine, which shaft is rotated through or by means of the usual drive-wheels, L L, attached thereto in the usual manner. The shaft I in this instance is the cutter-bar shaft, and is connected thereto by the usual connecting-rod, N. The cutter-bar O being parallel to the shaft F and at a right angle to the shaft I, the conduits D and E (the former only being shown) are curved, thus in this instance illustrating the facility with which my invention can be adapted to transmit power and motion in all practical directions.

I do not limit myself to the application of my invention to the machine herein shown, as it is applicable to every machine as a substitute for belting and gearing as now employed, and in the latter case all noise and in the former case all slipping of belts are avoided.

I deem it proper to add that many obvious changes may be made in the details of construction without departing from the spirit of my invention—as, for example, the chambers may be widely separated and the casings thereof suitably anchored, and the conduits may be flexible—as, for instance, rubber or leather hose—and still operate as means for conducting or guiding the current induced by one of the shafts to the other, and the chambers, as before stated, may be of any suitable size, according to the relative speed required, and either shaft may be the driven shaft.

In Fig. 3 the ends of the valves H are bored to receive the stems of bearing-plates $h$, seated on springs $h'$ to insure a tight fit of the same against the walls of the chambers.

Having described my invention and its operation, what I claim as new, and desire to secure by Letters Patent, is—

1. In a machine for transmitting motion and power, a chamber provided with a shaft having means for inducing a current in a liquid confined therein, a conduit therefrom to a secondary chamber provided with means adapted to be operated by said liquid current, and a return-conduit connecting said chambers, substantially as and for the purpose set forth.

2. A casing provided with two non-directly communicating chambers and two non-directly communicating conduits, each of said chambers having therein means for producing a current in a liquid confined therein, substantially as and for the purpose set forth.

3. The combination of a driving-shaft having a disk mounted rigidly thereon and provided with sliding valves, a surrounding case or chamber provided with valve-guides, separate conduits connecting said case or chamber with a second case or chamber having located therein a second shaft, disk, guides, and valves, substantially as shown and described.

4. In a machine for the transmission and application of motion and power to practical uses, the combination of a driving-shaft, a driven shaft, a body of liquid confined about each of said shafts and in a conduit which completes a circuit about said shafts, and means, substantially as described, for inducing a current in said liquid by the rotation of either of said shafts.

5. The combination of a driving-shaft, a driven shaft, a case or chamber about each, a curved conduit completing a circuit about said shafts, and means, substantially as described, for inducing a current in a liquid confined in said cases and conduit, substantially as shown and described.

6. The combination of the chambers B C, conduits D E, disks G J, valves H K, and guides $b\ b'\ l\ l'$, substantially as shown and described.

7. The combination of the shaft F, the shaft I, chambers B C, and curved conduits D E, and means, substantially as described, for inducing a current in a liquid confined in said chambers and conduits, substantially as specified.

In testimony whereof I affix my signature in presence of two witnesses.

LEOPOLD LAPYRE.

Witnesses:
JOSEPH FORREST,
JOSEPH R. EDSON.